United States Patent [19]

Shamlian et al.

[11] 3,828,611
[45] Aug. 13, 1974

[54] PORTABLE UNDERWATER INDICATING INSTRUMENT FOR DIVERS

[75] Inventors: Ralph B. Shamlian, Belmont; Ashley J. Hollingsworth, Atherton, both of Calif.

[73] Assignee: Farallon Idustries, Inc., Belmont, Calif.

[22] Filed: Nov. 10, 1972

[21] Appl. No.: 305,232

[52] U.S. Cl. .................... 73/300, 73/418, 73/431, 240/2.1, 240/2.25
[51] Int. Cl. ............................................ G01f 23/14
[58] Field of Search ............. 73/299, 300, 411–418, 73/431; 240/2.1, 2.25, 6.43; 58/50 A

[56] References Cited
UNITED STATES PATENTS

| | | | |
|---|---|---|---|
| 911,401 | 2/1909 | Junghans | 58/50 A |
| 2,459,694 | 1/1949 | Gordon | 58/50 A |
| 2,738,412 | 3/1956 | Spencer et al. | 240/2.1 |
| 2,974,474 | 3/1961 | Wegner | 240/2.1 |
| 3,681,587 | 8/1972 | Brien | 240/2.1 |

Primary Examiner—Donald O. Woodiel

[57] ABSTRACT

A portable underwater indicating instrument includes means for measuring a quantity of interest, such as time, pressure, temperature, magnetic field direction, or the like, and indicating means for indicating to the diver the measured quantity. The indicating means includes a dial having a face portion for viewing by the diver through a transparent window of a fluid tight housing. The dial face includes a fluorescent background with contrasting indicia of the measured quantity thereon. A light is provided in the housing for illuminating the fluorescent background portion of the dial. A manually operated switch controls energization of the light. The fluorescent background improves the visibility of the dial and also allows the lighted fluorescent dial to serve as an emergency light source. In a preferred embodiment, a pair of back-to-back pressure gauges are included within a common housing, one of the pressure gauges measures the diving depth and the second gauge measures the air pressure in the diver's scuba tank as communicated to the gauge over a flexible hose.

8 Claims, 8 Drawing Figures

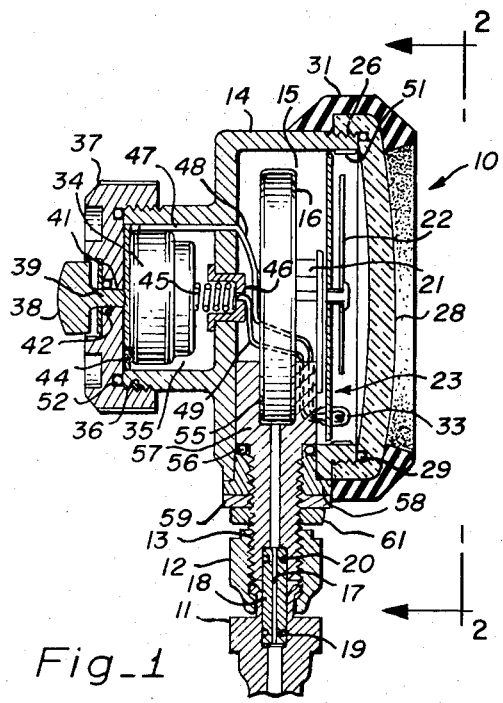
Fig_1
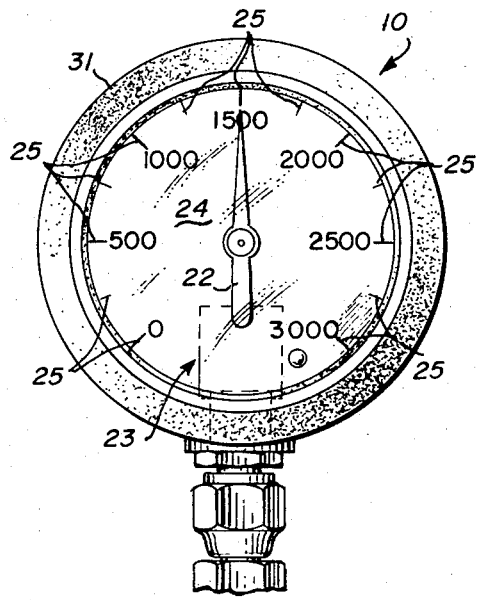
Fig_2
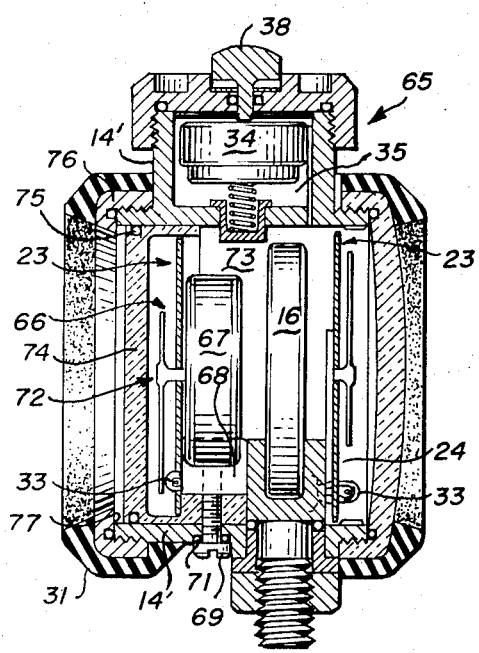
Fig_3
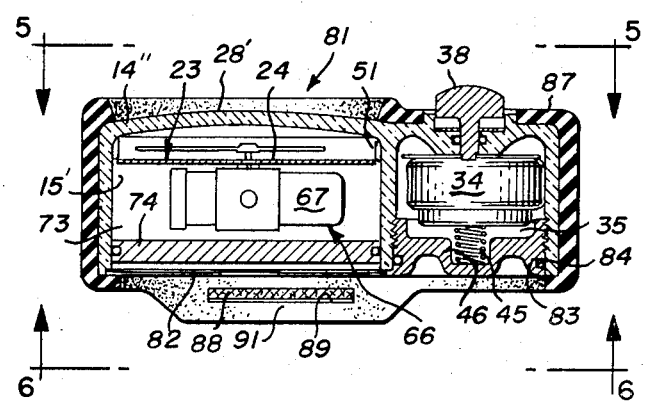
Fig_4

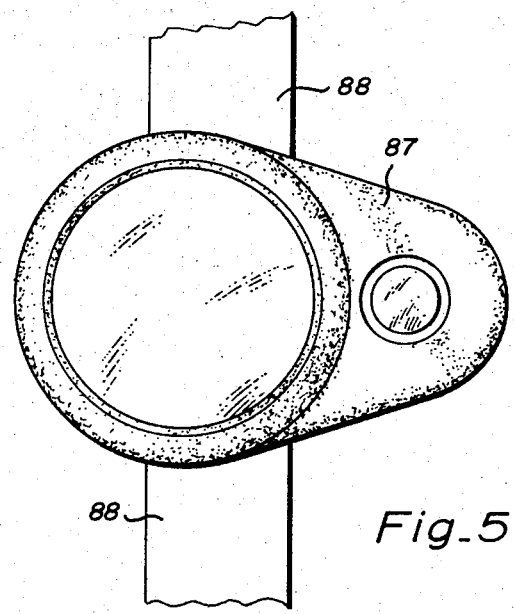
Fig_5
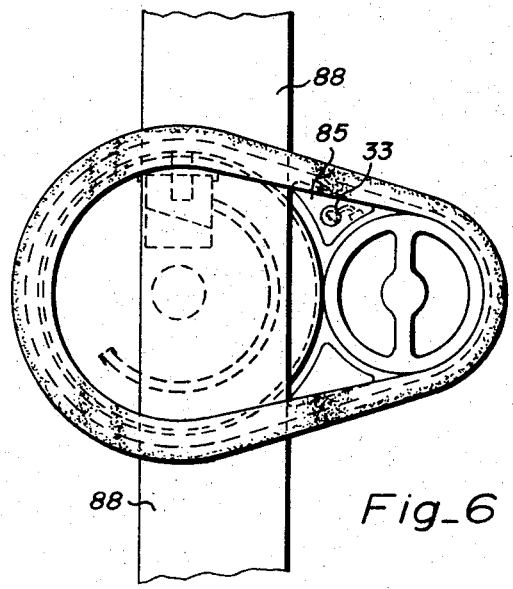
Fig_6

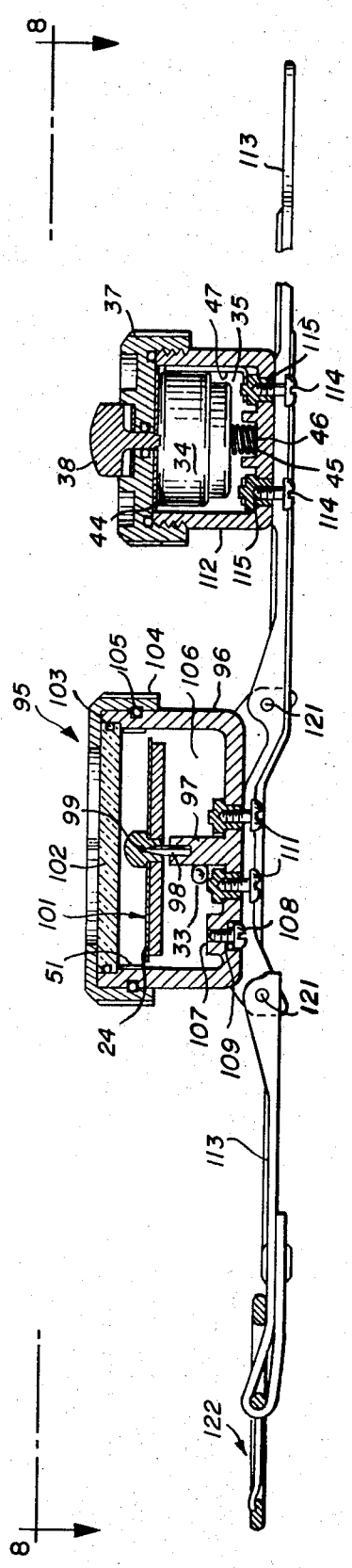
Fig_7
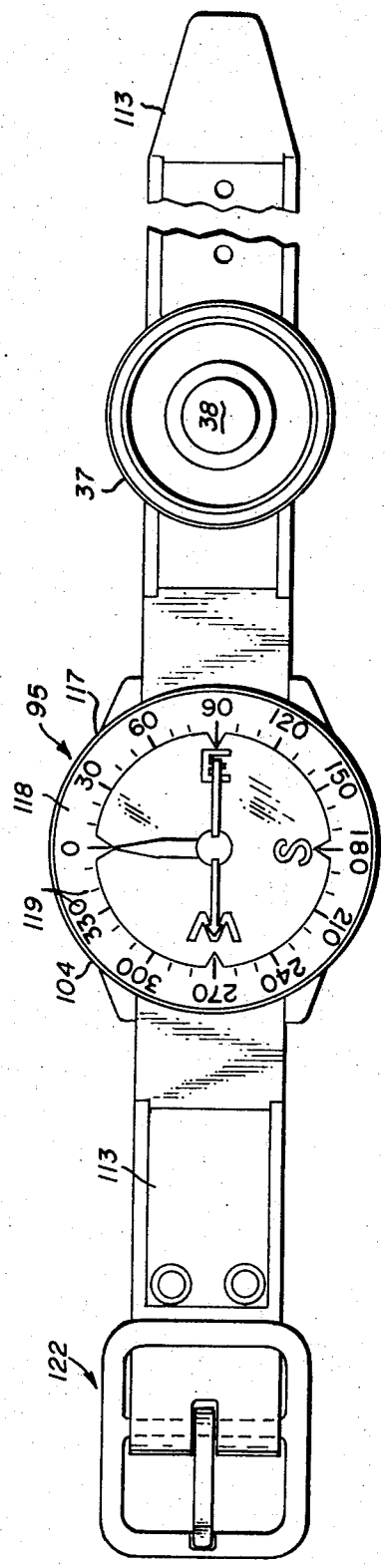
Fig_8

PORTABLE UNDERWATER INDICATING INSTRUMENT FOR DIVERS

BACKGROUND OF THE INVENTION

Heretofore, scuba divers have utilized underwater measuring instruments such as pressure gauges, depth gauges, compasses, water temperature gauges and the like for measuring and indicating quantities to the diver. These underwater instruments have generally included a watertight housing containing the device for measuring the quantity and an indicating device such as a dial and pointer for viewing by the diver through a window portion of the housing. The face of the indicating dial was generally black or of a dark color with fluorescent indicia such as numerals indicating the quantity being measured.

While such a prior art indicating device is useful at relatively shallow depths where a fair amount of ambient light is available, the device is generally unsuited for use in low visibility conditions, such as encountered in murky water or at substantial depths, as the available light is insufficient to provide sufficient energization of the fluorescent indicia to provide sufficient visibility to the diver for accurate reading. Of course, the dial could be illuminated with a flashlight but this requires that the diver carry with him a separate light and if that light fails or is lost or misplaced he is unable to read the various quantities being measured.

It is also known from the prior art that the dial of a wristwatch may be illuminated for ease of reading by incorporating a miniature light bulb in the watch glass cover. The filament of the bulb is energized with current supplied from batteries carried within a compartment of the watch band and controlled by means of a pushbutton switch located in the watch band for periodically illuminating the watch dial to facilitate reading in the dark. Such a device is disclosed and claimed in U.S. Pat. No. 3,018,614 issued Jan. 30, 1962. However, in this prior art device, the numerals are painted with luminous illuminating in the conventional manner.

SUMMARY OF THE PRESENT INVENTION 2

The principal object of the present invention is the provision of improved portable underwater indicating instruments for divers.

In one feature of the present invention, the indicating dial face of the underwater instrument comprises a fluorescent background with light contrasting indicia of the measured quantity formed thereon, and the means for artificially illuminating the dial face is formed integrally of the housing of the instrument, whereby improved readability of underwater instruments is obtained under conditions of poor visibility.

In another feature of the present invention, an underwater instrument includes an artifically illuminated fluorescent dial face. The battery which energizes the artifical illuminating means is contained within a housing having a removable cap with a depressible switch in the cap for actuation of the dial illuminating means.

In another feature of the present invention, a light reflective means at least partially circumscribes the outer periphery of the fluorescent dial for reflecting illumination back onto the fluorescent background of said dial for improving the visibility of the dial in use.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view of a pressure gauge assembly incorporating features of the present invention, FIG. 2 is a front view of the structure of FIG. 1 taken along line 2—2 in the direction of the arrows, FIG. 3 is a longitudinal sectional view of an alternative pressure gauge assembly of the present invention, FIG. 4 is a longitudinal sectional view of a wrist-worn depth gauge assembly incorporating features of the present invention, FIG. 5 is a top view of the structure of FIG. 4 taken along the line 5—5 in the direction of the arrows, FIG. 6 is a bottom view of the structure of FIG. 4 taken along line 6—6 in the direction of the arrows, FIG. 7 is a longitudinal sectional view of a wrist-worn compass assembly incorporating features of the present invention, and FIG. 8 is a top view of the structure of FIG. 7 taken along line 8—8 in the direction of the arrows.

DESCRIPTION OF THE PREFERRED EMBODIMENTS

Referring now to FIGS. 1 and 2, there is shown a pressure gauge assembly 10 incorporating features of the present invention. The pressure gauge 10 is for the purpose of indicating to the diver the pressure of his breathing fluid remaining in his scuba tank, not shown. The pressure gauge 10 is connected to the scuba tank via the intermediary of a flexible pressure hose 11 having a fitting 12 threadably mating with a threaded nipple 13 of the gauge 10. The hose 11 is of any convenient length as of 2 feet such that the diver can pull the gauge 10 into his view for observing the pressure remaining in his tank.

The pressure gauge 10 includes a gauge housing structure 14, as of polycarbonate resin, marketed under the trademark LEXAN by General Electric. The housing 14 includes a generally cup-shaped main compartment 15 for housing the bourdon tube 16 of a conventional high-pressure gauge. The inside of the bourdon tube 16 is connected in fluid communication with the nipple 13 and the hose 11 via an air spool 17 which comprises a hollow tubular member 18 having O-ring seals 19 and 20 at opposite ends thereof for making a rotary seal between the inside wall of the nipple 13 and the outside wall of the spool 17 at one end and a similar seal between the inside wall of the hose 11 and the outside wall of the spool 17 at the other end. In this manner, the gauge housing and nipple may be rotated relative to the hose 11 to facilitate viewing of the gauge 10 without kinking of the flexible hose 11.

The output of a bourdon tube 16 is coupled via the conventional gear mechanism 21 to an indicator needle 22 pivotably mounted over a fixed dial face 23. The dial face includes a fluorescent background portion 24 overprinted with numeric and scale mark indicia 25. The fluorescent background portion 24 is preferably made of fluorescent vinyl, marketed under the trademark PERMAGLOW by Mactac Corporation of Los Angeles. The fluorescent background preferably fluoresces in a nearly white color, whereas the indicia 25 and pointer 22 are painted or otherwise formed of a dark or black material such as black paint to form a high light contrast with the background 24. In a typical example, dial face 23 is circular with a diameter of 2.0 inches and provides 120 picolumins of fluorescent light output after having been fully charged for two minutes with illumination.

The lip of the cup shaped compartment 15 is externally threaded at 26 for threadably mating with the internal threads 27 of an outwardly dished transparent lens 28, as of transparent polycarbonate material. An O-ring seal 29 is retained within a groove within the lens for making a fluid tight seal between the lens 28 and the housing 14. A ring-shaped rubber boot 31 is snapped in place over the outer periphery of the lens 28 and housing 14 as a shock protector for the lens 28 and housing 14. A miniature incandescent lamp 33 is mounted in the face of the dial 23 for flooding the dial face 23 with illumination for charging the fluorescent background material 24. In a typical example, the miniature lamp 33 comprises an incandescent filament lamp rated for 190 milliamps of current at 3 volts.

The lamp 33 is energized with current from a three volt alkaline battery 34 contained within a cup-shaped battery compartment 35 of the housing 14. The lip of the battery compartment 35 is externally threaded at 36 to receive an internally threaded cap 37, as of polycarbonate material. A depressible actuating button 38, as of stainless steel, is centrally mounted of the cap 37 and includes a central extension 39 protruding through a hole 41 in the cap 37. An O-ring 42 is retained within a groove, circumscribing the wall of the hole 41, via a retaining washer 43, as of polycarbonate material sonically bonded to the cap 37.

A brass washer 44 is bonded to the inner end of the button 38 and the washer bears against one terminal of the battery 34 for making electrical contact thereto. An electrically conductive spring 45 is retained within a retaining cup 46 and makes electrical contact to the other terminal of the battery and spring biases the battery 34 against the washer 44. An electrical contact bar 47 is disposed along the sidewall of the battery compartment 35 and extends at one end through the end wall of the battery compartment into the pressure gauge compartment 15 where it is connected via wire 48 to one terminal of the lamp 33. The other terminal of the lamp 33 is connected to the spring 46 via wire 49. An O-ring 52 seals the battery compartment cap 37 to the battery housing 35.

The end of the contact bar 47, which is disposed adjacent the washer 44 is spaced from the washer by, for example, 1/16 of an inch such that the electrical circuit interconnecting the battery 34 with the lamp 33 is normally in the off position, i.e. disconnected. However, upon manual depression of the switch button 38, the washer 44 is pushed into contact with the end of the contact bar 47 thereby completing the electrical circuit and energizing the lamp 33 for charging the fluorescent background 24 of the dial 23.

A ring-shaped light reflective element 51 is disposed circumscribing the outer periphery of the dial 23 between the dial 23 and the lens 28 for reflecting the light generated by the lamp 33 and by the fluorescence of the background portion of the dial face 24 back toward the dial face to improve the visibility of the fluorescent dial face.

By the use of a luminescent sheet as the background 24, with the dial numerals and scale marks 25 printed in black, the total light emitting surface is much greater than that obtained by the prior art use of luminescent numerals on a black background. If the conventional luminescent painted numerals painted on a black background were used, the numerals could not be reactivated by means of a small low voltage bulb. The total energy absorbed over such a small area would be insufficient. However, by use of a relatively enormous luminescent background area 24 to intercept and absorb light energy, the total amount of reactivation resulting is much greater. Because of the requirements in underwater diving, this combination is particularly advantageous. More particularly, when near the surface, in high ambient light, the large luminescent area 24 provides a bright naturally activated high contrast dial 23. On deep dives, in low visibility, the momentary operation of the small bulb 33 will reactivate the dial 23 sufficiently for good contrast and visibility. In fact, the amount of illumination that can be obtained by depressing the button 38 is sufficient such that the illuminated dial face 23 may serve as an emergency light source useful for finding one's way in the dark and/or for signaling to other divers.

The nipple 13 is formed on the end of a bifurcated metallic block structure 55 disposed internally of the housing 14 for holding the bourdon tube 16. The nipple 13 is sealed to the housing 14 via an O-ring 56 disposed circumscribing a shoulder 57 at the juncture of the block portion 55 and the nipple 13. A flanged sleeve 58 circumscribes the nipple 13 and is pushed into engagement with the O-ring 57 via a nut 59 threaded over the threaded nipple 13, thereby fixedly securing the nipple and block 55 to the housing 14 in a fluid tight manner. A lock washer 61 is threaded over the nipple for locking the nut 59 in position.

Referring now to FIG. 3, there is shown an alternative pressure gauge assembly 65 of the present invention. The pressure gauge assembly 65 is substantially the same as that disclosed in FIGS. 1 and 2 with the exception that the battery compartment 35 has been moved to a top portion of the housing 14' and the housing 14', instead of being cup-shaped, is cylindrical to accommodate the tank pressure gauge assembly 16 plus a depth gauge assembly 66 disposed in back-to-back relation such that the same housing 14' may be utilized for two pressure gauge asemblies.

This housing embodiment forms the subject matter of, and is claimed in copending continuation application U.S. Ser. No. 462,099 filed Apr. 18, 1974 and assigned to the same assignee as the present invention.

The depth gauge assembly 66 includes a bourdon tube 67 fixedly secured to the inside wall of the housing 14' via a bifurcated block 68 and screw 69 sealed by means of an O-ring 71. Bourdon tube 67 is of the kind wherein the inside is evacuated such that the pressure surrounding the evacuated tube 67 serves to contract the bourdon tube such as to actuate the pressure gauge needle 72 via a suitable gear train mechanism, as previously described with regard to gauge 16. The ambient fluid pressure is communicated to the depth gauge bourdon tube 67 by immersing the bourdon tube 67 in an incompressible transparent fluid, such as oil, which fills the entire chamber 73 containing both bourdon tubes 67 and 16 and the corresponding dials 23.

The lens cover 74 for the depth gauge dial 23 comprises a piston made of a transparent material, such as transparent polycarbonate resin, and sealed to the inside of the cylindrical inside wall of the housing 14' via the intermediary of an O-ring 75 disposed at the outer periphery of the piston shaped lens cover 74. A polycarbonate internally threaded retaining ring 76 is threaded over the external threads on the housing 14' and includes an inwardly directed shoulder 77 for restraining excessive outward movement of the piston lens 74. A second ringshaped rubber boot 31 is snapped over the retaining ring 76. Both dials 23 are illuminated by lamps 33 energized from the battery 34 via the push button switch 38 in the manner as previously described with regard to the pressure gauge 10 of FIG. 1.

In operation, pressure from the diver's scuba tank is communicated to the first bourdon tube 16, as previously described with regard to FIG. 1, to yield a reading of tank pressure from its corresponding dial. The dial is read in low visibility conditions by depressing button 38 to reactivate the fluorescent background 24 of the dial 23. The depth gauge pressure is communicated to the second bourdon tube 67 via the piston lens 74 and the incompressible fluid 73 within the central chamber. The depth is read from the corresponding dial 23 which has been illuminated and recharged by lighting of lamp 33.

The advantage to the dual gauge assembly 65 is that two indicating instruments, such as gauges, may be employed in a common housing and energized with a common battery and switch 38, whereby the cost and complexity of the two gauges can be substantially reduced. In addition, the common fluid fill 73 serves as a further shock resistant mounting for the two gauge assemblies.

However, a small error in the high pressure gauge reading is occasioned by immersing the high pressure bourdon tube 16 in the depth gauge pressure transmissive fluid 73. More particularly, the error in the high gauge reading is directly proportional to depth and at a depth of 250 feet the high pressure gauge reading will read low by approximately 110 pounds, that is, the actual pressure in the scuba tank relative to sea level is 110 pounds more than indicated on the gauge. This is generally a negligible error and at any rate is a built in safety factor as the gauge indicates less pressure than actually exists in the tank.

Referring now to FIGS. 4, 5 and 6 there is shown an alternative depth gauge assembly 81 incorporating features of the present invention. The depth gauge 81 of FIG. 4–6 is substantially the same as that previously described with regard to FIG. 1–3 with the exception that the battery compartment 35 is formed in the housing 14" in side-by-side relation with the pressure gauge compartment 15. The housing is made of a transparent polycarbonate material such that the lens portion 28', for viewing the front face of the dial 23, is formed in a one piece construction as a part of the housing 14". The pressure transmissive piston 74 seals off the opposite end of the pressure chamber 15 and the chamber 15 is filled with an incompressible fluid 73. A retaining ring 82 restrains the piston 74 from being pushed out of the chamber 15.

In the battery compartment 35, the push button switch assembly is mounted in the closed end of the battery compartment 35 and the spring 45 is retained within a central well 46 in a threaded plug 83 which is threaded into the open end of the battery compartment 35 for closing same. Plug 83 is sealed to the inside wall of the compartment via an O-ring seal 84. Lamp 33 is disposed within a hollow well 85 in the housing 14" and light from the lamp 33 is projected through the transparent sidewall of the battery compartment 15' and through a hole in the ring mirror 51 onto the front fluorescent background 24 of the dial 23. Lamp 33 and the electrical circuit thereto is epoxied in place within the well 85 to provide a fluid tight compartment containing the lamp 33. A rubber shock resistant boot 87 is snapped in place around the housing 14". A rubber wrist band strap 88 passes through rectangular slots 89 in depending flange portions 91 of the housing 14" such that the pressure gauge 81 may be strapped to the wrist of the diver.

Referring now to FIGS. 7 and 8, there is shown a compass assembly 95 incorporating features of the present invention. The compass assembly 95 includes a cup-shaped compass housing 96, as of polycarbonate resin, having a centrally disposed axially directed pedestal 97 with an upwardly directed pivot point 98 onto which the jewel bearing assembly portion 99 of a compass card 101 is pivotably supported. A transparent lens 102 is sealed over the open end of the cup-shaped housing 96 via an O-ring seal 103. A rotatable cursor ring 104 is disposed about the outer periphery of the housing 96 and is locked to the housing 96 via a retaining ring 105 inserted within matching circumferential grooves in the housing 96 and cursor ring 104.

The compass housing 96 is filled with a suitable compass fluid 106, such as glycerine or kerosene. A fill hole 107 is provided in the bottom of the cup 96 and is closed by means of a screw 108 having an O-ring 109 sealing the screw 108 to the housing. A pair of electrical feedthrough members 111 provide means for making an electrical connection through the housing 96. A miniature lamp 33 is disposed in the housing 96 substantially on the axis of revolution of the compass card 101 such that the magnetic effect of the filament in the incandescent lamp 33 has a minimal effect upon the compass card 101. A mirror ring 51 is disposed at the lip of the housing 96 about the periphery of the compass card 101 for reflecting light from the lamp 33 onto the front face of the compass card 101.

A cylindrical battery housing 112 is fixedly secured to a rubber wrist strap 113 by a pair of electrically conductive screws 114 serving as portions of electrical feedthroughs 115 passing into the battery compartment 35 for making electrical connections to the battery 34. A pair of wires interconnect the feedthrough screws 114 with the respective terminals 111 on the compass housing 96. The wires are suitably insulated to prevent inadvertent shorting thereof. Terminal bar 47, as previously described, is connected to one of the terminals 114, whereas the spring 45 is connected to the other terminal. Depressing the button 38 completes the electrical circuit, as previously described, for energizing the lamp 33 to illuminate the front fluorescent face 24 of the compass card 101. As previously described with regard to the other embodiments of the present invention, the compass card 101 includes the fluorescent background 24 and the contrasting black or dark indicia 25 overprinted thereon. Likewise, the rotary cursor 104 includes an annular front face portion 117 having a fluorescent background 118 and dark or black color indicia 119 overprinted thereon.

The strap 113 is pivotally connected via pins 121 to the housing 96 in the same manner that the wrist strap of a watch is connected to the casing of a wrist watch. A buckle 122 is affixed to one end of the wrist strap 113 for buckling the strap to the wrist of the diver. As in the other embodiments, the relative large area of fluorescent background 24 with contrasting numerals or indicia provides increased visibility of the compass under conditions of poor visibility and low ambient light intensity by momentarily depressing the switch button 38 for energizing the lamp 33 and reactivating the fluorescent face or background 24 of the compass card 101.

What is claimed is:

1. In a portable underwater indicating instrument to be carried by and for use by a diver:

measuring means for measuring a quantity of interest to the diver;

indicating means coupled to said measuring means for indicating to the diver the measured quantity of interest;

housing means for housing said measuring and indicating means and having a transparent window portion for viewing of said indicating means;

said indicating means including, a dial means having a face portion facing outwardly of said housing for viewing by the diver, said face portion having a fluorescent background with a light contrasting indicia of the measured quantity thereon; and means for artificially illuminating said dial face portion of said indicating means with light to charge said fluorescent background, said illuminating means being coupled to said housing means to be carried with said housing, said illuminating means including, a light bulb coupled to said housing for illuminating said background, a battery chamber for containing a battery to be connected for energizing said light bulb, and a switch connected in circuit with the battery and said bulb for controlling the energization of said light bulb.

2. The apparatus of claim 1 wherein said fluorescent background is made of a fluorescent vinyl material.

3. The apparatus of claim 1 wherein said indicia are of a dark color relative to said background.

4. The apparatus of claim 1 including a wrist strap affixed to said housing for strapping said housing to the diver's wrist.

5. The apparatus of claim 1 wherein said switch includes a manually depressible button for actuation by the diver to turn on said switch, and means for spring biasing said switch to the off position such that in the absence of manual depression of said button said switch is in the off position.

6. The apparatus of claim 1 wherein said housing includes a battery compartment for containing said battery, a removable closure for closing said compartment, and wherein said switch means is carried in said removable closure.

7. The apparatus of claim 4 including, a battery housing for housing said battery and being carried from said strap, said battery housing including a removable closure portion closing said housing, and wherein said switch means is carried in said removable closure portion of said battery housing.

8. The apparatus of claim 1 wherein said light bulb is disposed outwardly of said dial face portion of said indicating means and, including, a light reflective means at least partially circumscribing the outer periphery of said dial for reflecting illumination back onto said fluorescent background of said dial.

* * * * *